(12) United States Patent
Ford et al.

(10) Patent No.: US 11,868,803 B2
(45) Date of Patent: *Jan. 9, 2024

(54) PROCESS INTEGRATED MECHANISM APPARATUS AND PROGRAM

(71) Applicant: Florida Institute of Human and Machine Cognition, Inc., Pensacola, FL (US)

(72) Inventors: Kenneth M. Ford, Pensacola, FL (US); Niranjan Suri, Pensacola, FL (US)

( * ) Notice: Subject to any disclaimer, the term of this patent is extended or adjusted under 35 U.S.C. 154(b) by 491 days.

This patent is subject to a terminal disclaimer.

(21) Appl. No.: 16/849,425

(22) Filed: Apr. 15, 2020

(65) Prior Publication Data
US 2020/0241919 A1 Jul. 30, 2020

Related U.S. Application Data

(63) Continuation of application No. 15/462,960, filed on Mar. 20, 2017, now Pat. No. 10,733,014, which is a continuation-in-part of application No. 13/071,020, filed on Mar. 24, 2011, now Pat. No. 9,600,438, which is a continuation-in-part of application No. 12/006,535, filed on Jan. 3, 2008, now abandoned.

(51) Int. Cl.
 G06F 9/48 (2006.01)
 G05B 19/042 (2006.01)
 G06F 9/54 (2006.01)

(52) U.S. Cl.
 CPC ....... *G06F 9/4881* (2013.01); *G05B 19/0421* (2013.01); *G05B 2219/39146* (2013.01); *G06F 9/54* (2013.01)

(58) Field of Classification Search
 None
 See application file for complete search history.

(56) References Cited

U.S. PATENT DOCUMENTS 5,937,388 A * 8/1999 Davis ............... G06Q 10/06316
714/15

* cited by examiner

*Primary Examiner* — Qing Yuan Wu
(74) *Attorney, Agent, or Firm* — J. Wiley Horton (57) ABSTRACT

A method and apparatus for controlling and coordinating a multi-component system. Each component in the system contains a computing device. Each computing device is controlled by software running on the computing device. A first portion of the software resident on each computing device is used to control operations needed to coordinate the activities of all the components in the system. This first portion is known as a "coordinating process." A second portion of the software resident on each computing device is used to control local processes (local activities) specific to that component. Each component in the system is capable of hosting and running the coordinating process. The coordinating process continually cycles from component to component while it is running. The continuous cycling of the coordinating process presents the programmer with a virtual machine in which there is a single coordinating process operating with a global view although, in fact, the data and computation remain distributed across every component in the system.

9 Claims, 6 Drawing Sheets

PROCESS INTEGRATED MECHANISM APPARATUS AND PROGRAM

CROSS-REFERENCES TO RELATED APPLICATIONS

This application is a continuation of U.S. application Ser. No. 15/462,960. The parent applications lists the same inventors.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of coordinating the behavior of multiple components. More specifically, the invention comprises a mechanism and method for controlling the actions of multiple components by continually transferring a coordinating process from component to component.

2. Description of the Related Art

There are several prior art approaches to controlling a number of independent components which need to cooperate in order to achieve an objective. One example of such a problem involves the control and coordination of teams of semi-autonomous robots engaged in complex tasks requiring coordinated action. There are presently no completely satisfactory techniques for reliably coordinating such teams in realistically complex environments. The obvious and traditional approach is to include in the team a single coordinating authority that directs and coordinates the activities of all team members. This approach, however, has a high communication overhead because the coordinating authority needs to have complete and up-to date information about the operational state of each of the robots. In addition, the overall system is inherently fragile, as any damage to the coordinating authority can render the entire team leaderless. The chief advantage of having a single coordinating authority, however, is simplicity of implementation and predictability of overall team behavior.

Another approach to coordinating a team of robots is to assign an "agent" status to each robot. Each robot is responsible for its own actions and maintaining its own worldview. Coordination amongst the agents can require something akin to social negotiation with all its concomitant uncertainties and high computational and communication costs.

Biologically inspired approaches have been developed to avoid some of the problems inherent in explicit coordination schemes. Biological coordination occurs with a flock of birds or a colony of ants. Coordination is possible without sharing a great deal of information. Using the quasi-biological approach, organized behavior must emerge dynamically from the individual actions of "swarms" of simple robots. All of these approaches lack a common viewpoint or perspective on the action of the entire team considered as an integrated system. This shortcoming makes the programming and control of these systems very difficult.

In general the prior art systems suffer from one or more of the following known weaknesses:

CODE COMPLEXITY: Non-centralized approaches to control and coordination of multiple nodes tend to be complex to design and implement, making it difficult and time consuming to develop, test, and debug. Moreover, the complexity of the solution tends to make it difficult to understand and its behavior difficult to predict.

LACK OF ROBUSTNESS: A key issue is how a system behaves when one or more of its components are lost. In prior art systems using a single central node for control, the destruction of that single node will cause the overall system to either fail completely or be seriously degraded in effectiveness. Prior art systems have addressed this concern by "electing" a new central control node when the existing node is lost. However, this election mechanism tends to be complex.

COMPLEXITY OF COORDINATION: As discussed above, when a collection of robots is conceptualized as a team of independent agents, many complex issues arise concerning how best to communicate and coordinate the activities of the team. In fact, much of the communication required in such systems involves negotiation between the agents. Some of these solutions are also unpredictable in their overall behavior.

DATA MANAGEMENT DIFFICULTY: In systems using modern sensors, the amount of data often dwarfs the computational process. As sensors get smarter, they will need to coordinate better to jointly interpret observations. In this context, any truly useful system must excel in simplifying the coordination requirements for large networks of smart sensors and effectively manage data.

DATA INSECURITY: Many, if not all, applications deal with the collection and manipulation of sensitive data that must be guarded and cannot be released. In prior art systems, the requirements for data exchange make it difficult to safeguard data that is resident on nodes.

In summary, prior art systems known to the Applicants require elaborate protocols for communicating between agents, coordinating separate views of the situation or achieving consensus before taking group action. Further, prior art protocols must be written so as to accommodate the architectural complexities of the dynamics of each of the components involved. Thus, there is need in the art for a system of coordination and communication that, for example only and not by way of limitation, eliminates all point-to-point communication, involves no negotiation protocols and eliminates the need to move large volumes of data.

BRIEF SUMMARY OF THE INVENTION

The present invention is a method and apparatus for controlling and coordinating a multi-component system. Each component in the system contains a computing device. Each computing device is controlled by software running on the computing device. A first portion of the software residing on each computing device is used to control operations needed to coordinate the activities of all the components in the system. This first portion is known as a "coordinating process." A second portion of the software residing on each computing device is used to control local processes (local activities) specific to that component.

Each component in the system is capable of hosting and running the coordinating process. However, the coordinating process does not remain with any single component. Instead, the coordinating process continually cycles from component to component while it is running. The code itself is not transferred. Each computing device contains the complete code needed to run the coordinating process. Only a small execution state is transferred. A cache of currently active data may also be transferred along with the execution state in order to enhance performance.

The continuous cycling of the coordinating process presents the programmer with a virtual machine in which there is a single coordinating process operating with a global view although, in fact, the data and computation remain distributed across every component in the system. In other words, a run-time system manages the cycling of the coordinating process and this cycling is "invisible" to the running of the coordinating process itself.

| REFERENCE NUMERALS IN THE DRAWINGS | | | |
|---|---|---|---|
| 8 | process integrated mechanism | 10 | first component |
| 12 | second component | 14 | third component |
| 16 | fourth component | 18 | fifth component |
| 20 | local process | 22 | coordinating process |
| 24 | CP transfer loop | 26 | interface |
| 28 | first lifting jack | 29 | second lifting jack |
| 30 | drive motor | 32 | lifting screw |
| 34 | load | 36 | height sensor |
| 38 | lifting arm | 39 | second control unit |
| 41 | first control unit | | |

DETAILED DESCRIPTION OF THE INVENTION

Figure 1:
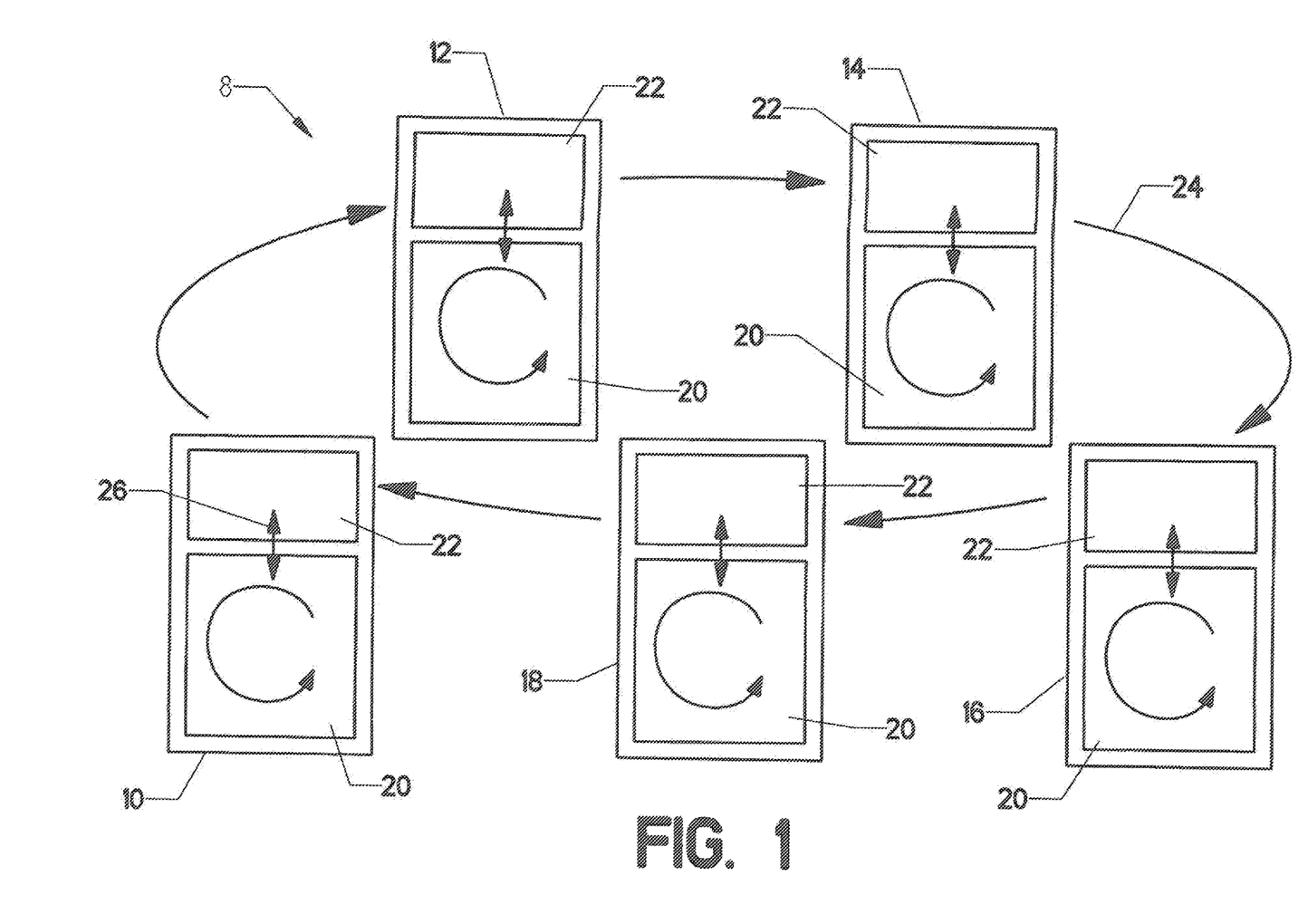
FIG. 1 is a schematic view, showing the cycling of the coordinating process between the components of a multi-component system.

FIG. 1 schematically depicts the present invention operating in a system having five individual components. The entire system is labeled as process integrated mechanism 8. The five components are labeled as first component 10, second component 12, third component 14, fourth component 16, and fifth component 18. The invention is designed to coordinate the actions of the five individual components in order to achieve a common objective.

The components may not be identical. For example, first component 10 might be a mobile robot while fourth component 16 might be a stationary sensor array. Each component includes a computing device running software. The software on the computing device is broadly divided into two sets. The first set of software code runs a coordinating process needed to coordinate the activities of all components in said multi-component system. The second set of code runs one or more local processes needed to operate only the individual component.

In FIG. 1, each component is graphically depicted as including a coordinating process 22 and a local process 20. Interface 26 represents a mechanism for exchanging information (such as data and commands) between the coordinating process and the local process. The coordinating process, local process, and interface are not necessarily separate code modules. The three functions may—in fact—be implemented using a single body of computer code. The depiction of these functions as separate and distinct refers to their operation more than how they are actually implemented. Those familiar with the art of computer programming will of course understand that they may be implemented in many different ways.

Local process 20 on each component is conventional. For the example of a component that is a mobile robot, the local process would control such functions as drive wheels, chassis articulation, sensor deployment, data gathering, etc. Coordinating process 22, however, is not conventional.

Each of the five components shown in the example of FIG. 1 contains the entire code needed to run the coordinating process (hereinafter sometimes referred to as the "CP"). Each component can in fact host and run the CP. However, instead of running the CP continuously on one "host" component, the CP is regularly cycled through every component using CP transfer loop 24. The CP runs on the individual component for a preferably brief interval (a "residency time") then cycles on to the next component. The CP is preferably cycled through every component in this manner.

When the CP is not running on a particular component, local processes continue to execute on that component. Thus, the component is not inactive waiting for the return of the CP. It is still doing things. In this specific example, at any given instant, there will be one CP and five sets of local processes.

A run-time system is used to control the running of the CP and the cycling of the CP from component to component. This run-time system is analogous to the run-time systems used to run multiple independent processes on a single microprocessor. Such time-sharing models revolutionized computing because they allowed multiple processes to run on the same processor at the same time while maintaining the "illusion" (from the perspective of each individual process) that the process was the only one running on the machine. This feature allowed the programmers to construct the program with no concern for the details of switching between the processes.

The run-time system controlling the cycling of the CP from component to component is invisible to the CP. This action creates a virtual machine in which there is a single CP operating with a unified and global view although—in reality—data and computation remain distributed across process integrated mechanism 8. The system is therefore the opposite of what has been done previously in the time-sharing models. Prior art models shared the CPU among many processes. The present invention shares many CPU's among a single process (the CP).

Figure 2:
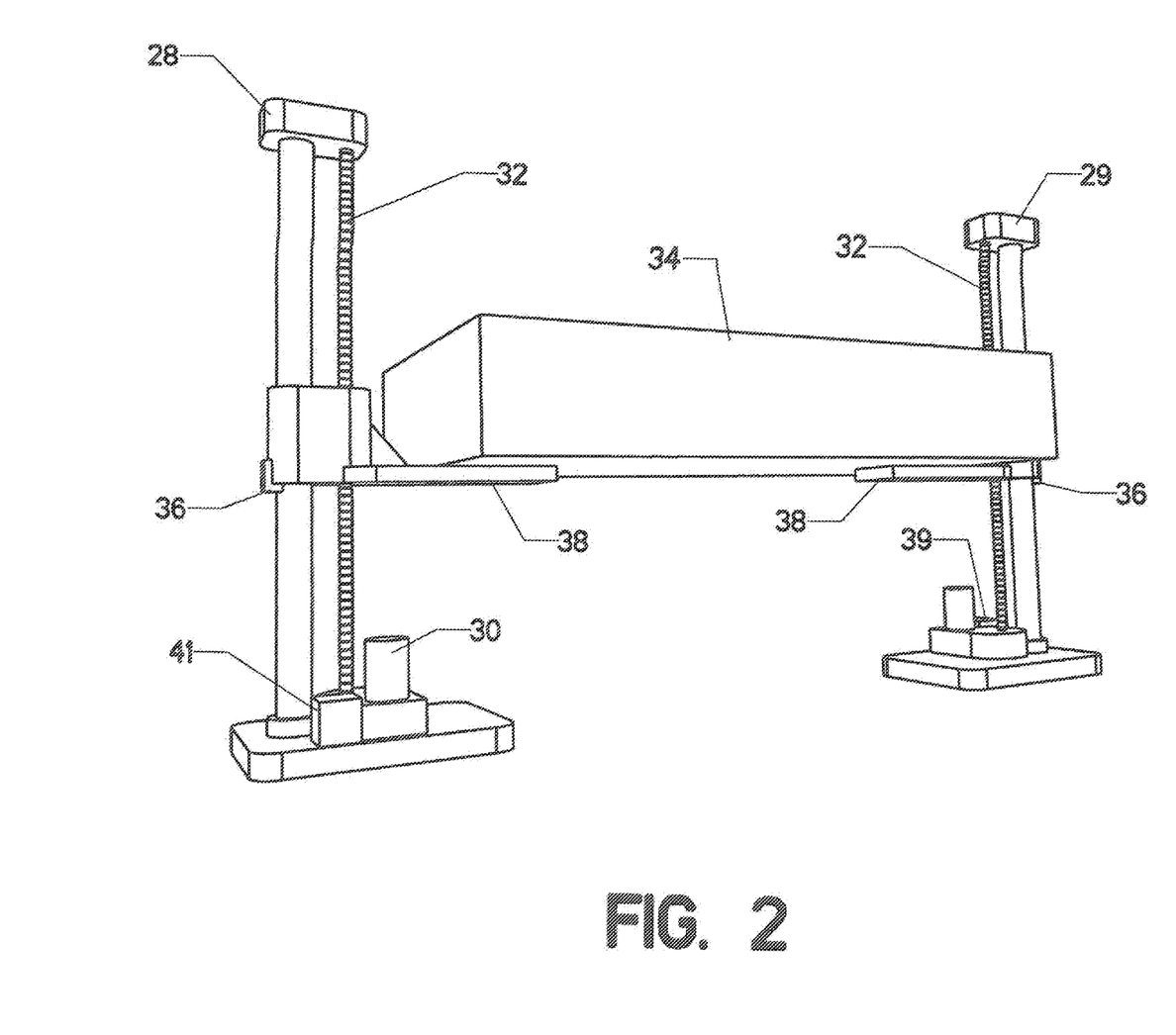
FIG. 2 is a perspective view, showing the present inventive method applied to a system having two components.

A simple example will help to explain this concept. FIG. 2 shows a process integrated mechanism having two components—first lifting jack 28 and second lifting jack 29. Each lifting jack includes a drive motor 30 which turns a lifting screw 32 in order to raise and lower a lifting arm 38. The current height of each lifting arm is determined by a height sensor 36.

Figure 3:
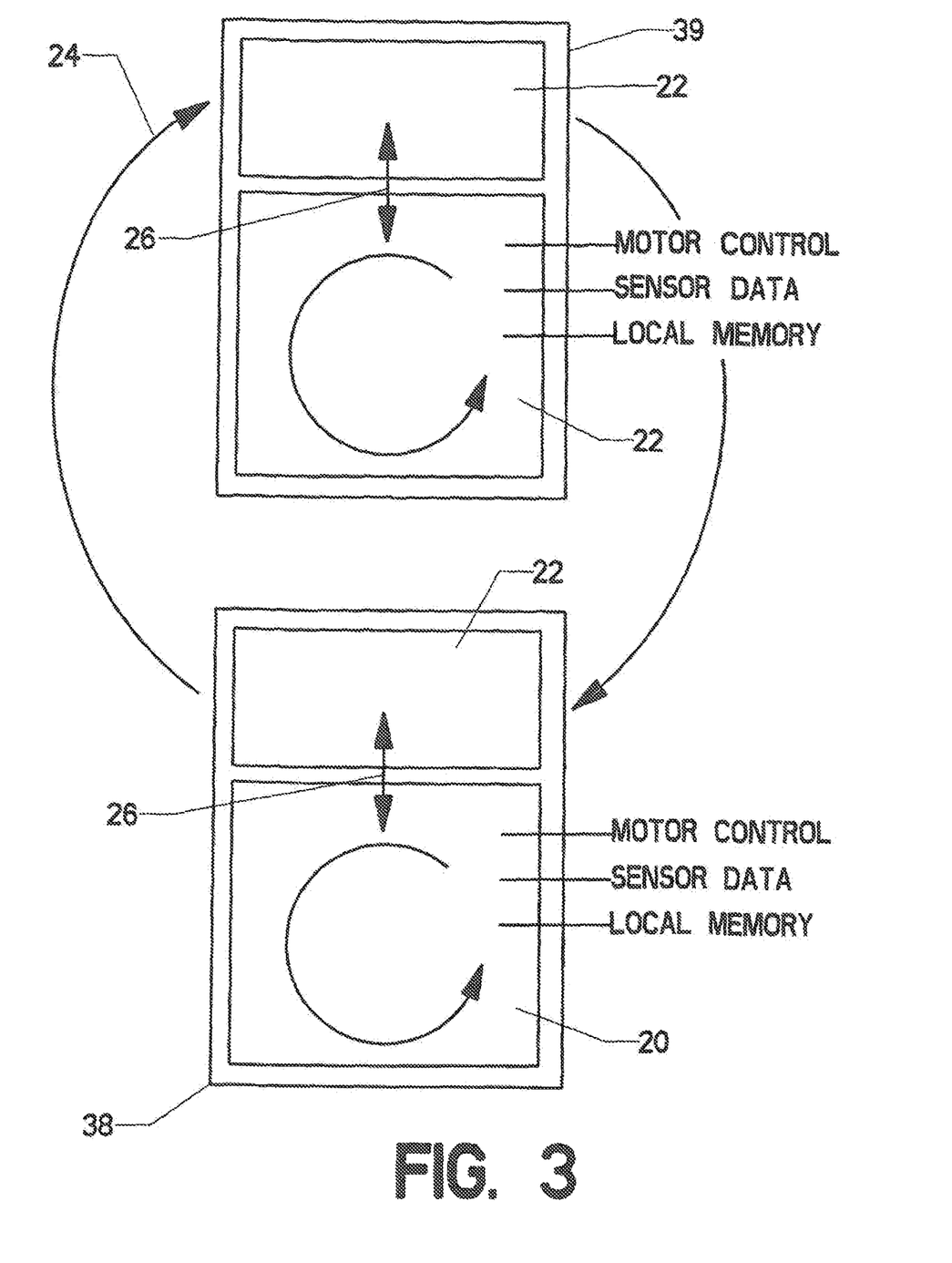
FIG. 3 is a schematic view, showing the cycling of the coordinating process in the system of FIG. 2.

First lifting jack 28 includes first control unit 41. Second lifting jack 29 includes second control unit 39. Each control unit contains a computing device running a coordinating process and one or more local processes. FIG. 3 graphically depicts the operation of the two control units. First control unit 41 includes local process 20, coordinating process 22, and interface 26. The local processes on each component are concerned with things such as motor control, receipt and storage of height sensor information, and memory functions. The CP is concerned with coordinating the operation of the two components to achieve a common objective. As for the example of FIG. 1, the CP cycles between the two components using CP transfer loop 24.

Returning to FIG. 2, the reader will observe that the two lifting jacks are being used to raise a commonly supported load 34. Thus, the common objective is to balance and raise the load. The reader should note that this is a very simple example, and that other more conventional solutions may serve well for the coordination and control of such a simple example. It is presented as a starting point to aid the reader's understanding and should not be viewed as a typical application for the present invention.

The objective of the process integrated mechanism of FIG. 2 is to balance load 34 while raising it to a higher elevation. FIG. 3 shows the cycling process that is used to achieve the objective. Because the objective is quite simple, a very simple piece of software can be used for the CP.

Each lifting jack has a value "H" corresponding to the height measured by its height sensor. Each lifting jack is able to receive and execute a command to rotate its lifting screw in order to raise its lifting arm a fixed amount. One approach to coordinating the activity would then be to incrementally raise the first lifting jack while also adjusting the second lifting jack so that it tracks the motion of the first lifting jack (thereby ensuring that both sides lift evenly). The second lifting jack is raised whenever the difference in heights between the two exceeds a specified value "e."

The first lifting jack is designated as "LJ1" while the second is designated as "LJ2." The height value for the first lifting jack is designated as "LJ1:H" while the height value for the second lifting jack is designated as "LJ2:H." The lift command is written as "LJ1-LIFT:X" or "LJ2-LIFT:X" (where "X" is the amount of lift commanded). The incremental lift given to the first lifting jack is a specified amount "y."

Using these variables, the CP software might look like the following:

| LINE | CODE |
| --- | --- |
| 10 | IF |LJ1:H − LJ2:H|>e |
| 20 | THEN |
| 30 | LJ2-LIFT:|LJ1:H − LJ2:H| |
| 40 | ELSE |
| 50 | LJ1-LIFT:y |

Those skilled in the art will realize that many other code features would typically be included, such as starting and ending conditions for controlling the software loop. These have been omitted in order to avoid confusion. The simple piece of code provided tests the difference in height between the two lifting jacks and—depending on the condition it finds—it either raises the height of the second lifting jack to match the first or incrementally raises the height of the first.

Of course, the CP software does not run continuously on one computing device. Instead, it cycles back and forth between first control unit 41 and second control unit 39. The simple code presented may run in several different ways, depending on the cycling of the CP.

Assume—for example, that the code begins running (at code line 10) while the CP is running on first control unit 41. Code line 10 attempts to evaluate the expression |LJ1:H−LJ2:H|>e. The value for LJ1:H is found in local memory associated with first control unit 41 (since the first height sensor and the first control unit are both part of the first lifting jack). However, no current value is found for LJ2:H since that data is collected and stored on the second lifting jack (And—the reader should recall—there is no centralized collecting of data).

In response, the CP caches the value it has for LJ1:H and continues cycling until it receives a value for LJ2:H. The run-time process which controls the cycling of the CP at some point cycles the CP to second control unit 39 in the second lifting jack. The run-time or execution state information transferred would include the information that the CP is currently running code line 10 and that code line 10 had not yet successfully executed.

Upon arrival the CP retrieves the value of LJ2:H stored in the memory associated with second control unit 39. The CP then evaluates the expression in code line 10. Assuming that the height difference is greater than the specified value "e" then the CP will go to code line 30 (LJ2-LIFT:|LJ1H-LJ2:H|) and produce a lift command for the second lifting jack. Assuming that the CP is still residing on the second lifting jack at that time, then the lift command will immediately transfer to the local processes running on the second lifting jack and the command will be executed.

While a discussion of the run-time process which controls the cycling of the CP and its execution is beyond the scope of this disclosure, it may be helpful to understand some of its probable attributes. In the very simple code example given, the run-time process could store information as to which code line was last completely executed and the values for each variable in use. This information would be part of the "execution state" which is transferred with the CP.

The reader will recall that each component in the process integrated mechanism contains the entire CP code. Thus, the run-time process might transfer the information that the CP is running code line 10, that code line 10 had not yet successfully executed, and a value for LJ1:H. In this example, the execution state information does not appear to be much smaller than the code itself. However, the reader should bear in mind that a realistic CP might be 50,000 lines of code while the realistic execution state information might only be 50 values. Thus, in a more typical embodiment of the invention, the transfer of the run state is much more efficient than transferring the CP code itself.

The run-time process preferably "knows" what information has been successfully passed from coordinating process 22 running on each component to local processes 20 and vice-versa. As an example, if the lifting command for the second lifting jack is issued by the CP while the CP is running on the first lifting jack, the run-time process needs to "know" that the command has not been acted upon yet and that the command needs to be retained and reissued when the CP transfers to the second lifting jack. Again, all these control mechanisms are invisible to the CP itself and the programmer writing that code need not be concerned with the details of the CP cycling between components.

With this information in mind, those skilled in the art will realize that even the simple code section presented above can execute in different ways (depending upon the cycling of the CP). The following tables present possible execution sequences:

TABLE ONE

| CP Location | Code Execution |
|---|---|
| LJ1 | Evaluate expression \|LJ1:H − LJ2:H\|<br>(unable to complete because no value for LJ2:H)<br>Cache value for LJ1:H |
| LJ2 | Evaluate expression<br>\|LJ1:H − LJ2:H\|<br>(assume result is 0.1 and that this is greater than "e")<br>Cache value for LJ2:H<br>Execute LJ2-LIFT(0.1) |

TABLE TWO

| CP Location | Code Execution |
|---|---|
| LJ1 | Evaluate expression \|LJ1:H − LJ2:H\|<br>(unable to complete because no value for LJ2:H)<br>Cache value for LJ1:H |
| LJ2 | Evaluate expression \|LJ1:H − LJ2:H\|<br>(assume result is 0.1 and that this is greater than "e")<br>Cache value for LJ2:H |
| LJ1 | Nothing |
| LJ2 | Execute LJ2-LIFT(0.1) |

TABLE THREE

| CP Location | Code Execution |
|---|---|
| LJ1 | Evaluate expression \|LJ1:H − LJ2:H\|<br>(unable to complete because no value for LJ2:H)<br>Cache value for LJ1:H |
| LJ2 | Evaluate expression \|LJ1:H − LJ2:H\|<br>Cache value for LJ2:H |
| LJ1 | Evaluate expression \|LJ1:H − LJ2:H\|<br>(assume result is 0.1 and that this is greater than "e") |
| LJ2 | Execute LJ2-LIFT(0.1) |

The result of the three possibilities will be the same, though the exact timing may vary somewhat depending on the location of the CP at different points in the process. The reader will therefore appreciate how the continual cycling of the CP from component to component creates a virtual machine in which a single CP has a global view of all components in the system. This is true even though data storage and the actual running of the computation needed to run the CP remain distributed across all the components.

Figure 4:
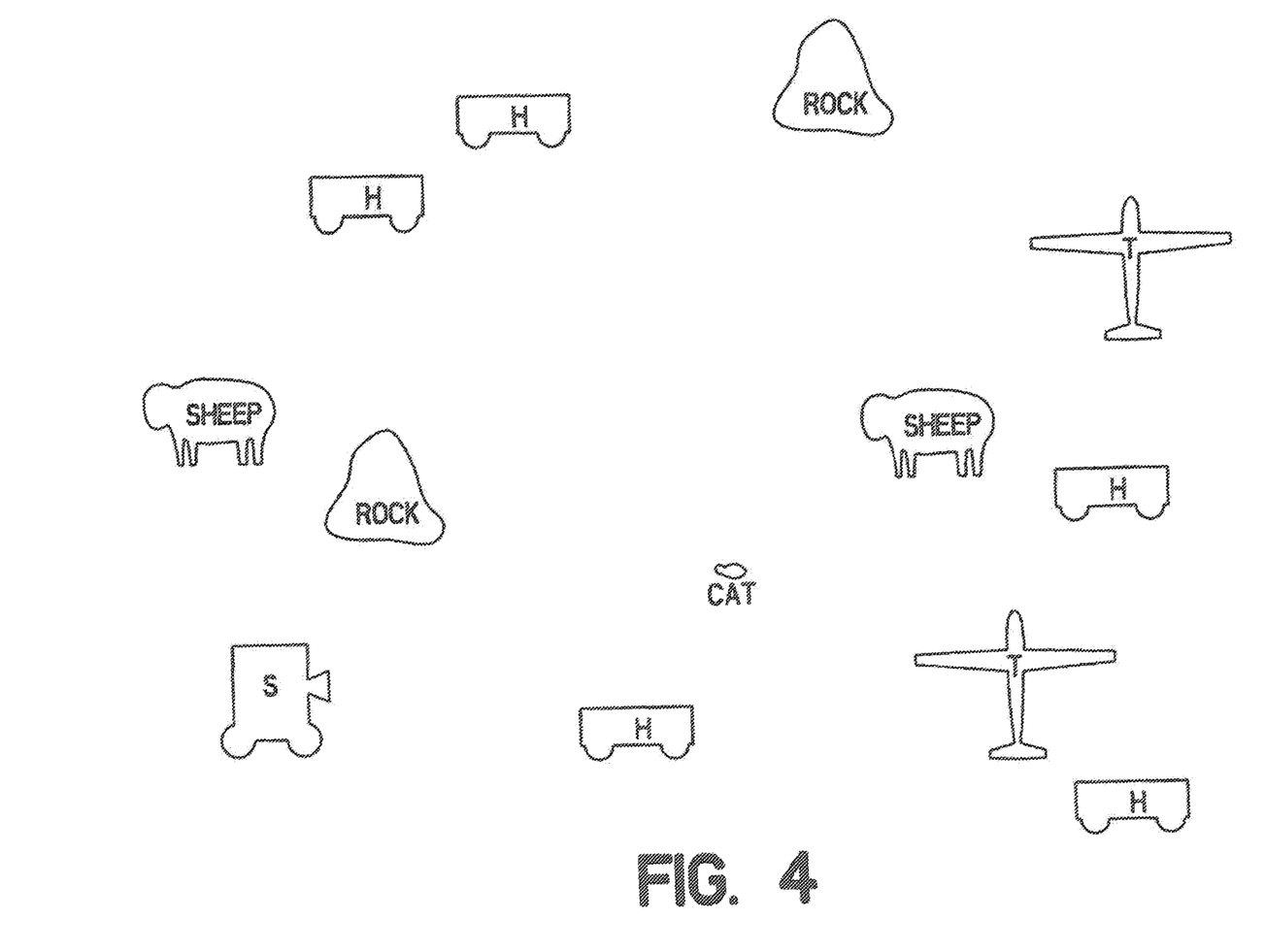
FIG. 4 is a schematic view, showing a more complex process.

A more realistic application for the present invention may serve to better illustrate the advantage of cycling the CP using only the execution state. FIG. 4 shows a depiction of a task in the "pursuit domain." The objective is to herd the two sheep to a central location and hold them there. Other factors include the presence of stationary objects which are about the same size as the sheep (rocks) and mobile objects which are small but present a body temperature similar to the sheep (cats).

Three vehicles are employed. The herding vehicles ("H") are ground vehicles which have both shape sensors and heat sensors. However, the sensors on the herding vehicles have very limited range. The seer vehicle ("S") is a ground vehicle having a long range shape sensors. A seer vehicle cannot distinguish animals from rocks but it can distinguish a large object (such as a rock or a sheep) from a small object (a cat). The tracking vehicles ("T") are aerial vehicles that have a heat sensor (enabling them to distinguish animals from rocks) but no shape sensor.

In FIG. 4, the sheep are randomly distributed and the vehicles have the objective of cooperating to assemble the sheep. Each vehicle has a computing device containing the software code required to run the CP. As for the prior examples, the CP cycles from component to component (vehicle to vehicle).

This example assumes that all the sensors are completely reliable and that each vehicle has accurate GPS-based information so that its location is precisely known (and stored locally on each vehicle). The reader should bear in mind that this herding example is still rather simple and that the true benefit of the present invention is more apparent for complex systems.

This explanation focuses on that part of the CP dealing with sensor fusion to identify sheep. The seers and trackers follow predetermined paths specified in the CP code. It is often helpful in designing a process integrated mechanism (PIM) program to initially solve the problem by assuming an omniscient, centralized processor that "knows" everything that is known to any component in the PIM. Given these assumptions, one may implement the global view as a grid array indicating the presence of sheep at each coordinate location, where the values might be (sheep, sheep-shaped object, warm object, no object).

A new observation consists of a feature value, its coordinates, and the time of the observation. Each new observation can be used to update the global view using the information summarized in the table below:

TABLE FOUR

| New Observation (at x, y) | Old Value | Undated Value |
|---|---|---|
| None | Anything | None |
| Warm | Sheep-shape | Sheep |
| Warm | Sheep | Sheep |
| Warm | Warm or none | Warm |
| Sheep-shape | Warm | Sheep |
| Sheep-shape | Sheep | Sheep |
| Sheep-shape | Sheep-shape or none | Sheep-shape |
| Sheep | Anything | Sheep |

Because of the nature of the data, an efficient implementation would use a data structure suitable for representing sparse arrays. With this, the algorithm for the hypothetical omniscient, centralized processor might look like:

```
LOOP {WHEN OBSERVATION (f, x, y) ARRIVES,
    UPDATE GLOBAL VIEW ENTRY FOR
    POSITION (x, y) ACCORDNG TO TABLE FOUR}
```

In implementing the algorithm for running in the PIM environment it is helpful to make several observations. First, one can observe that virtually the same algorithm can run directly on the PIM. The only change would be to use a priority queue based on time-stamp order. Each component would use local processes to process its sensor data and cue a set of new observations. When the CP is resident on a particular component it has access to the observations residing on that component and it processes those observations as usual.

In the simplest implementation, one could move the "global view" data (preferably as a sparse matrix representation) with the CP (a form of mobile data cache). If this creates a CP that is too cumbersome for the application, there are many ways to reduce the size of the data stored by trading off the residency time of the CP on each individual component (If the CP moves quickly from component to component then it can operate with little or no mobile data cache since it will have access to the data on each component within a relatively short period of time).

Alternatively, one could choose to move only a subset of the available global data in a mobile data cache (such as only those values that had significantly changed in the last cycle). When the CP is resident on any particular component having new observations, those observations replace the existing corresponding ones in the mobile data cache. In the worst case, an observation would stay in the cache for at most one complete cycle around the components. Those skilled in the art will realize that by adjusting the cache size, once can trade effective computational speed against the size of the CP footprint.

Figure 5:
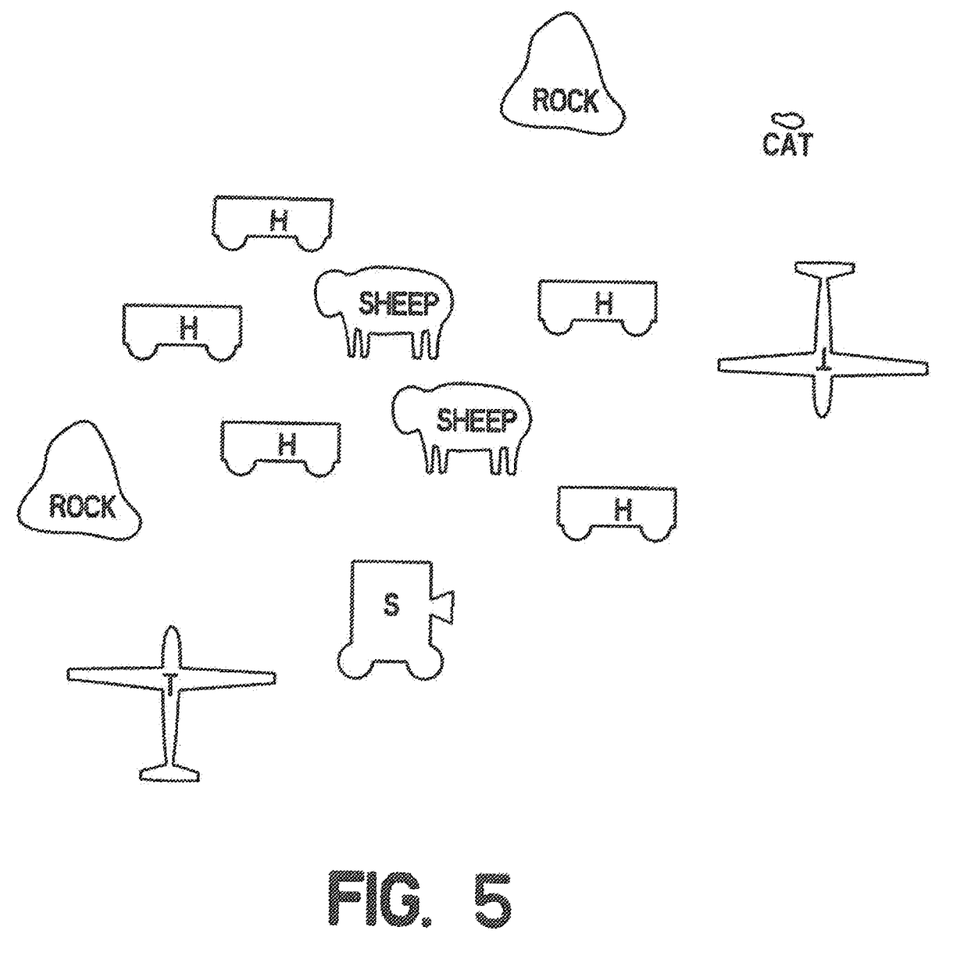
FIG. 5 is a schematic view, showing the process of FIG. 4 after a solution has been achieved.

In the example of FIG. 4, the CP cycles around the components as they perform their assigned tasks. Each sensor on each vehicle provides information and this is used to determine whether a sheep is present at a particular grid location. Once a sheep is found, it is herded to a central location and held there by the herding vehicles. The CP iterates until the result of FIG. 5 is achieved. The sheep are centrally located and they are surrounded by herding vehicles.

The prior example illustrates some of the inherent trade-offs between system performance and the need to transfer a mobile data cache along with the CP. As stated previously, if one rapidly moves the CP it may not be necessary to transfer any mobile data at all. A more detailed discussion of these trade-offs may aid the reader's understanding. First, the reader should recall that all the software code actually needed to run the CP is resident on each component. Only the execution state of the CP needs to be transferred. At a minimum this execution state would include the current process stack—the stack in the virtual machine with sufficient information to that the next step in the process can be executed. Beyond that there is a time-space trade off on how much data is transferred with the process.

At one extreme, no data is transferred and computations that require a memory access would be delayed until the CP is once against resident on the component which possesses the required data. Of course, more optimized performance may often be achieved by moving a data cache along with the CP.

Table FIVE shows the trade-off between the reactivity of the PIM and the amount of computation it can perform (assuming that 25 ms are required to transfer the CP from component to component). A longer residency time on each component reduces the total fraction of time lost to CP transfer delays (thereby increasing the total time for computation). A shorter residency increases the total fraction of time lost to CP transfer delays.

TABLE FIVE (Percent Effective Computation)

| No. of components | Cycle Time (ms) | | | |
| --- | --- | --- | --- | --- |
| | 400 ms | 800 ms | 1200 ms | 1600 ms |
| 4 | 75% | 88% | 92% | 94% |
| 8 | 50% | 75% | 83% | 86% |
| 12 | 25% | 63% | 75% | 81% |
| 16 | N/A | 50% | 67% | 75% |
| 20 | N/A | 38% | 58% | 69% |
| 24 | N/A | 25% | 50% | 63% |

A shorter residency time will of course enhance the CP's ability to coordinate the overall responses to new and unexpected events. But, as residency time is decreased, the relative overhead associated with moving the CP increases. In the extreme case, this could produce a situation in which very little computation actually pertaining to performing the functions of the CP could be done.

The following expressions describe these phenomena:

$$\text{Cycle-time} = \text{\# of components} * (\text{residency time} + \text{time to move CP}), \text{ and}$$

$$\text{Percent computation available} = (\text{residency time})/(\text{residency time} + \text{time to move CP})$$

There is clearly a trade-off between cycle time, the number of components in the PIM, and the percent of effective computation time available. As the number of components grows (or the cycle time is reduced), the CP gets less effective computation time.

Those skilled in the art will realize that with the speed of current processors, and the fact that the CP can offload intensive computation (such as image processing) to local processors, even modest computation percentages may be adequate. However, in designing a PIM for an application requiring very fast reactions, one may need to limit the number of components.

One of the key advantages of the PIM is the fact that it can continue operating despite the loss of one or more of its member components. And—this result can be achieved with little effort required from the programmer. The CP should not be written in a way that depends upon being resident on any specific component. Rather, it should be written in terms of available capabilities, maintained by the PIM run-time system. Using the sheep herding example, the CP cares about what herding robots are available and where they are but does not care about the identity of specific components. The algorithm continually optimizes the activities of the herders that are available. If a particular herder becomes stuck in the mud, then the PIM run-time system may be able to "recruit" a new herder invisibly to the CP. Likewise, whenever a new herder becomes available (is added to the PIM), the CP can then utilize the new herder in the next cycle.

Figure 6:
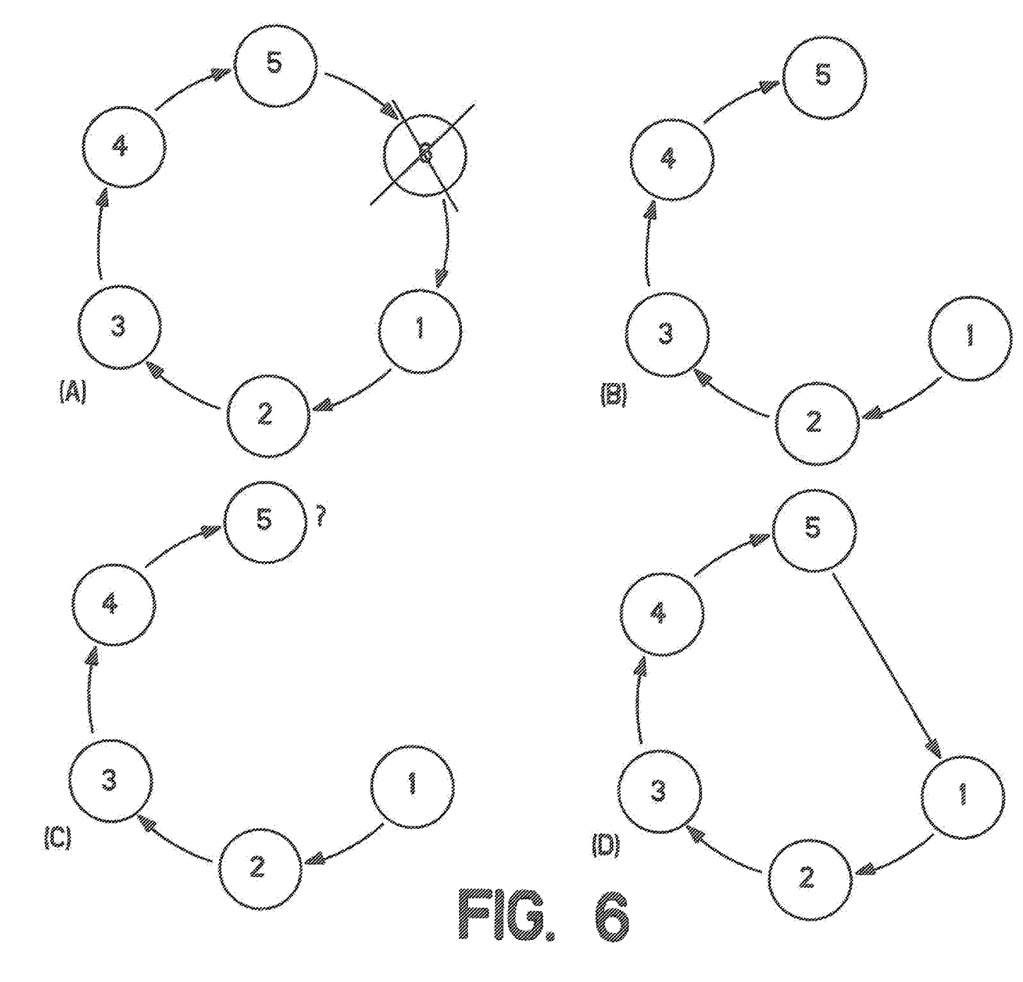
FIG. 6 is a schematic view, showing the effect of the elimination of a single components using the present system.

There are two possible situations when a component is lost (or loses communication with the other components). In the first situation a component is lost when the CP is not running on that component. In the second situation a component is lost when the CP is running on that component. FIG. 6 illustrated the operation of the PIM in these two scenarios.

In FIG. 6(*a*) the CP is cycling through six components. The CP is actually running on Component 4 when Component 6 is destroyed. The run-time process controlling the transfer of the CP is configured to poll the next component in line. It waits for a response before transferring the CP. In FIG. 6(*b*) the CP has transferred to Component 5. Component 5 is polling Component 6 but is receiving no response (FIG. 6(*c*)).

The run-time transfer process is configured to poll the next component in line—in this case Component 1. Upon receipt of a response from Component 1, Component 5 transfers the CP to Component 1 (shown in FIG. 6(*d*)). The cycling then continues, except that the run-time process now "knows" that the CP should transfer from Component 5 to Component 1. If Component 6 later reappears, the run-time process can be configured to reintroduce it into the loop.

The scenario is different if the component actually running the CP is lost. Returning to FIG. 6(*a*), this scenario assumes that the CP is running on Component 6 at the time Component 6 is lost. The CP's run state is thereby lost and it will not be passed on. One way to handle this scenario is to provide a run-time time-out mechanism so that the loss is detected. Each component "knows" when it should next receive the CP. If the expected time interval is exceeded then information can be passed around the loop to determine where the most recent surviving example of the CP exists. That most recent example is then used to restart the cycle. Because of the short cycle times of the process, the "reactivated" CP will only be slightly out of date. The PIM should then continue without any noticeable effect.

The preceding description contains significant detail, but it should not be construed as limiting the scope of the invention but rather as providing illustrations of the preferred embodiments of the invention. Thus, the scope of the invention should be fixed by the following claims, rather than by the examples given.

The invention claimed is:

1. A method for coordinating actions of a plurality of components in a multi-component system, wherein each of said plurality of components includes a computing device, comprising:
    (a) providing a first set of software code needed to run a coordinating process on each of said computing devices;
    (b) providing a set of local software code needed to run local processes on each of said computing devices;
    (c) wherein said coordinating process controls operations needed to coordinate the activities of said components in said multi-component system;
    (d) cycling said coordinating process through each of said components in said multi-component system by transferring an execution state of said coordinating process through each of said components, with said coordinating process running on each of said components for a residency time;
    (e) wherein said coordinating process only communicates with one of said sets of local software code running on one of said components when said coordinating process is running on said one of said components;
    (f) wherein said coordinating process issues a command to a specific component in said multi-component system and said issued command is transferred to said specific component when said coordinating process is running on said specific component.

2. A method for coordinating the actions of a plurality of components as recited in claim 1, further comprising providing an interface between said first set of software code and said each of said sets of local software code whereby information and commands can be transferred between said first set of software code and one of said sets of local software code.

3. A method for coordinating the actions of a plurality of components as recited in claim 2, further comprising:
    (a) providing a run-time system for transferring said coordinating process from component to component;
    (b) providing a component loss detection system for detecting when a component is unable to receive said coordinating process; and
    (c) in the event that said component loss detection system determines that a component is unable to receive said coordinating process, transferring said coordinating process to an alternate component.

4. A method for coordinating the actions of a plurality of components as recited in claim 2, further comprising:
    (a) providing a mobile data cache for storing data which is used by said coordinating process; and
    (b) transferring said mobile data cache along with said coordinating process.

5. A method for coordinating the actions of a plurality of components as recited in claim 1, further comprising providing a run-time system for transferring said coordinating process from component to component, wherein said transference is invisible to said coordinating process.

6. A method for coordinating the actions of a plurality of components as recited in claim 1, further comprising:
    (a) providing a mobile data cache for storing data which is used by said coordinating process; and
    (b) transferring said mobile data cache as part of said execution state of said coordinating process.

7. A method for coordinating the actions of a plurality of components as recited in claim 1, further comprising:
    (a) providing a run-time system for transferring said coordinating process from component to component;
    (b) providing a component loss detection system for detecting when a component is unable to receive said coordinating process; and
    (c) in the event that said component loss detection system determines that a component is unable to receive said coordinating process, transferring said coordinating process to an alternate component.

8. A method for coordinating the actions of a plurality of components as recited in claim 1, further comprising:
    (a) providing a run-time system for transferring said coordinating process from component to component;
    (b) providing a component loss detection system for detecting when a component is lost while said coordinating process is running on said lost component; and
    (c) in the event that said component loss detection system determines that a component is lost while running said coordinating process, activating a most recent available copy of said coordinating process on an alternate component.

9. A method for coordinating the actions of a plurality of components as recited in claim 1, further comprising:
    (a) providing a run-time system for transferring said coordinating process from component to component;
    (b) providing a component loss detection system for detecting when a component is lost while said coordinating process is running on said lost component; and
    (c) in the event that said component loss detection system determines that a component is lost while running said coordinating process, activating a most recent available copy of said coordinating process on an alternate component.

* * * * *